July 25, 1967  M. J. DEL ROSSI  3,332,533
ARTICLE CONVEYING APPARATUS
Filed July 12, 1965  4 Sheets-Sheet 1

INVENTOR
MICHAEL J. DEL ROSSI
BY

ATTORNEYS

July 25, 1967  M. J. DEL ROSSI  3,332,533
ARTICLE CONVEYING APPARATUS
Filed July 12, 1965  4 Sheets-Sheet 3

INVENTOR
MICHAEL J. DEL ROSSI
BY
ATTORNEYS

July 25, 1967  M. J. DEL ROSSI  3,332,533
ARTICLE CONVEYING APPARATUS
Filed July 12, 1965  4 Sheets-Sheet 4

INVENTOR
MICHAEL J. DEL ROSSI

BY

ATTORNEYS

3,332,533
ARTICLE CONVEYING APPARATUS
Michael J. Del Rossi, Philadelphia, Pa., assignor to Bayuk Cigars Incorporated, Philadelphia, Pa., a corporation of Maryland
Filed July 12, 1965, Ser. No. 471,191
1 Claim. (Cl. 198—66)

This invention relates to an improvement in an article conveying apparatus and more particularly relates to a gate or shunt means for changing the route taken by the articles being conveyed.

It is known to convey elongated articles, for example cigars, along a supporting table by means of parallel conveyor chains each having fingers to engage the article and each passing around a sprocket at the discharge end of the conveying apparatus. It is also known to associate with such a conveyor guide means extending from the table to guide the article in gravity fall to a second conveyor which discharges at a station remote from the discharge end of the first conveyor. If the second conveyor becomes inoperative for any reason, it is generally necessary to shut down the first conveyor and any associated machinery, for example a cigar making machine. This obviously is objectionable under many circumstances where, despite the inoperability of the second conveyor, it is desired to maintain the upstream operation such as making cigars in operation.

It is therefore the object of this invention to provide means for rerouting the articles discharged from the conveyor table so as to by-pass the second conveyor when desired.

The invention and its objects will be fully understood from a reading of the following description in conjunction with the drawings, in which.

Figure 1:
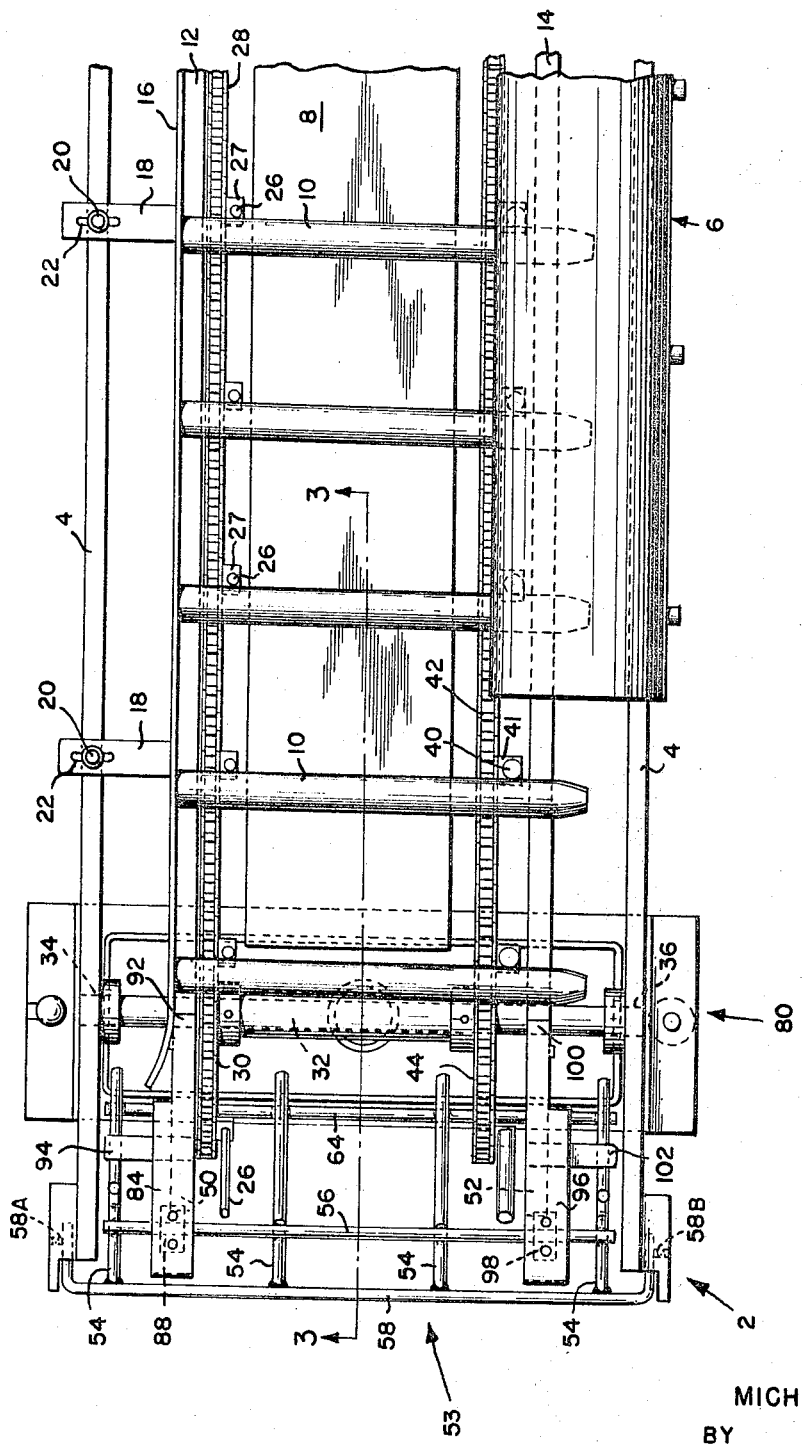
FIGURE 1 is a plan view partially broken away showing apparatus embodying the invention.

Referring now to FIGURE 1, conveying apparatus 2 in accordance with the invention has a frame 4 on which is mounted a cigar heater unit 6 adjacent a table 8 which is also mounted on frame 4 for the support of cigars 10. Cigars 10 are also supported by strips 12 and 14. Strip 12 has an upstanding guide rail 16 secured thereto which in turn is secured to straps 18 which are attached to frame 4 by screws 20 passing through slots 22.

The cigars 10 are advanced from right to left as viewed in FIGURE 1 by pusher fingers 26 which are secured to bracket 27 attached to a link chain 28 which passes around a driving sprocket now shown and around sprocket 30 which is fixedly secured to shaft 32 which is mounted for rotation in frame 4 as indicated at 34 and 36. Cigars 10 are also advanced by pusher fingers 40 which are secured to brackets 41 attached to a link chain 42 which passes around a driven sprocket not shown and around sprocket 44 which also is fixedly secured to shaft 32.

A pair of guide rails 50 and 52 extend from the terminal ends of strips 12 and 14, respectively, in downwardly extending arcs respectively adjacent sprockets 30 and 44. An outer guide member 53 is formed adjacent guide rails 50 and 52 and comprises arcuate rods 54 which are welded to transverse tie rods 56, 58, 62 and 64 with tie rod 58 having its ends secured to frame 4 at 58a and 58b respectively and tie rods 62 being secured to frame 4 at 64 and 66, respectively. Guide rails 50 and 52 and guide member 53 serve to guide the cigars 10 as they are discharged from the conveyor to a point below the sprockets 30 and 44.

A guide conduit 72 is positioned below the lower terminal ends of guide member 53 and guide rails 50 and 52 for the reception of cigars and has a lower portion 74 which has a gradually reducing cross-section and which discharges into a pneumatic conduit 76. A flip-pin 78 is mounted in conduit 72 so as to engage a falling cigar off center and flip it into a substantialy upright position to facilitate its passage into conduit 76. Conduit 72 is flanged to frame 4 as indicated at 80.

A gate member 84 is pivotally secured to rod 56 as indicated at 88 and has a terminal end portion 92 which rests on the end of strip 12. Member 84 has a stop member 94 which is adapted to engage the adjacent end rod 54 when the gate is in open position shown in phantom in FIGURE 3. A second gate member 96 is pivotally secured to rod 56 as indicated at 98 and has an end portion 100 which overlies the end of strip 14. Gate member 96 is provided with a stop member 102 which is adapted to engage the adjacent end rod 54 when the gate member is in the open position. The gate members 84 and 96 are shown in the closed or shut position in FIGURES 1 through 3.

Operation

Figure 2:
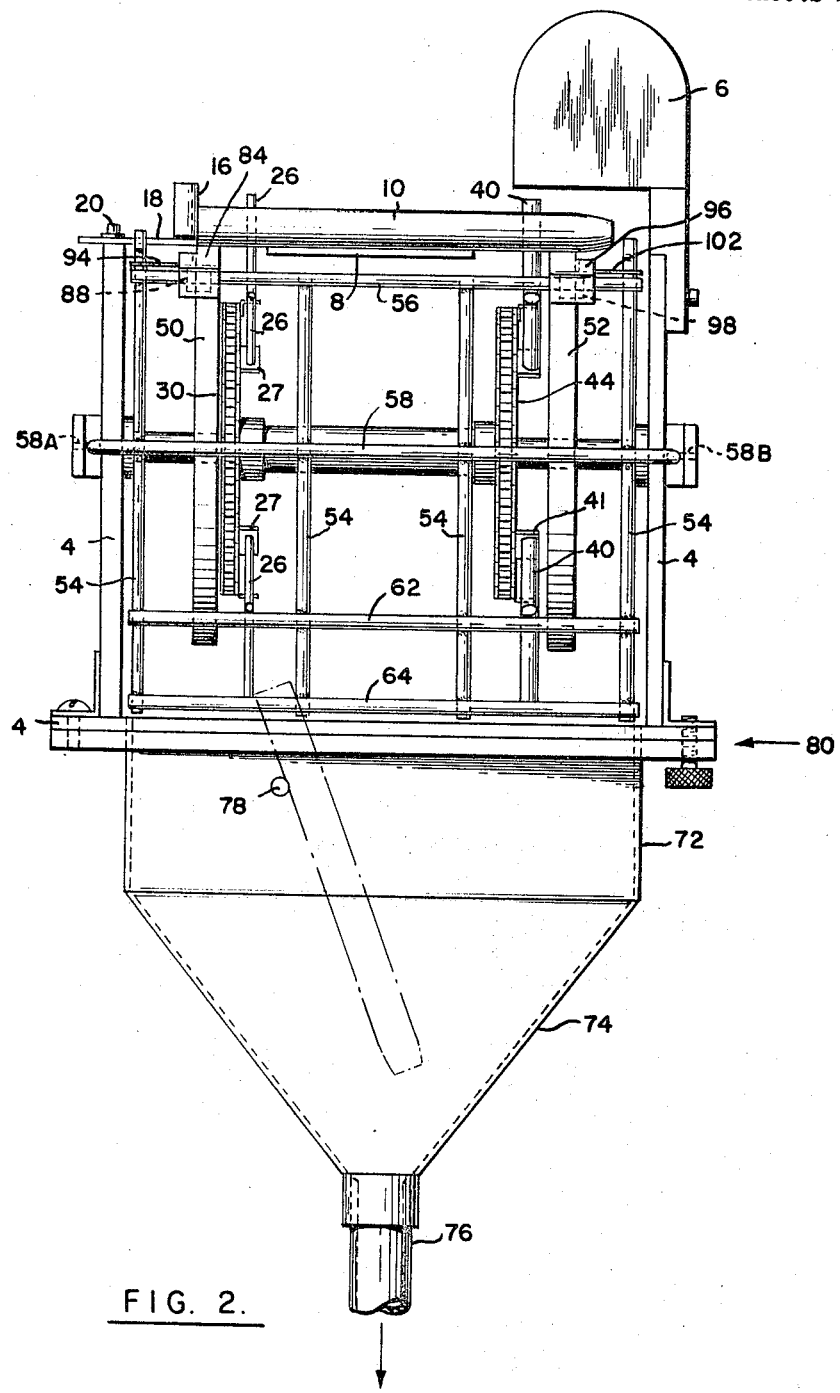
FIGURE 2 is an end view of the apparatus of FIGURE 1.
Figure 3:
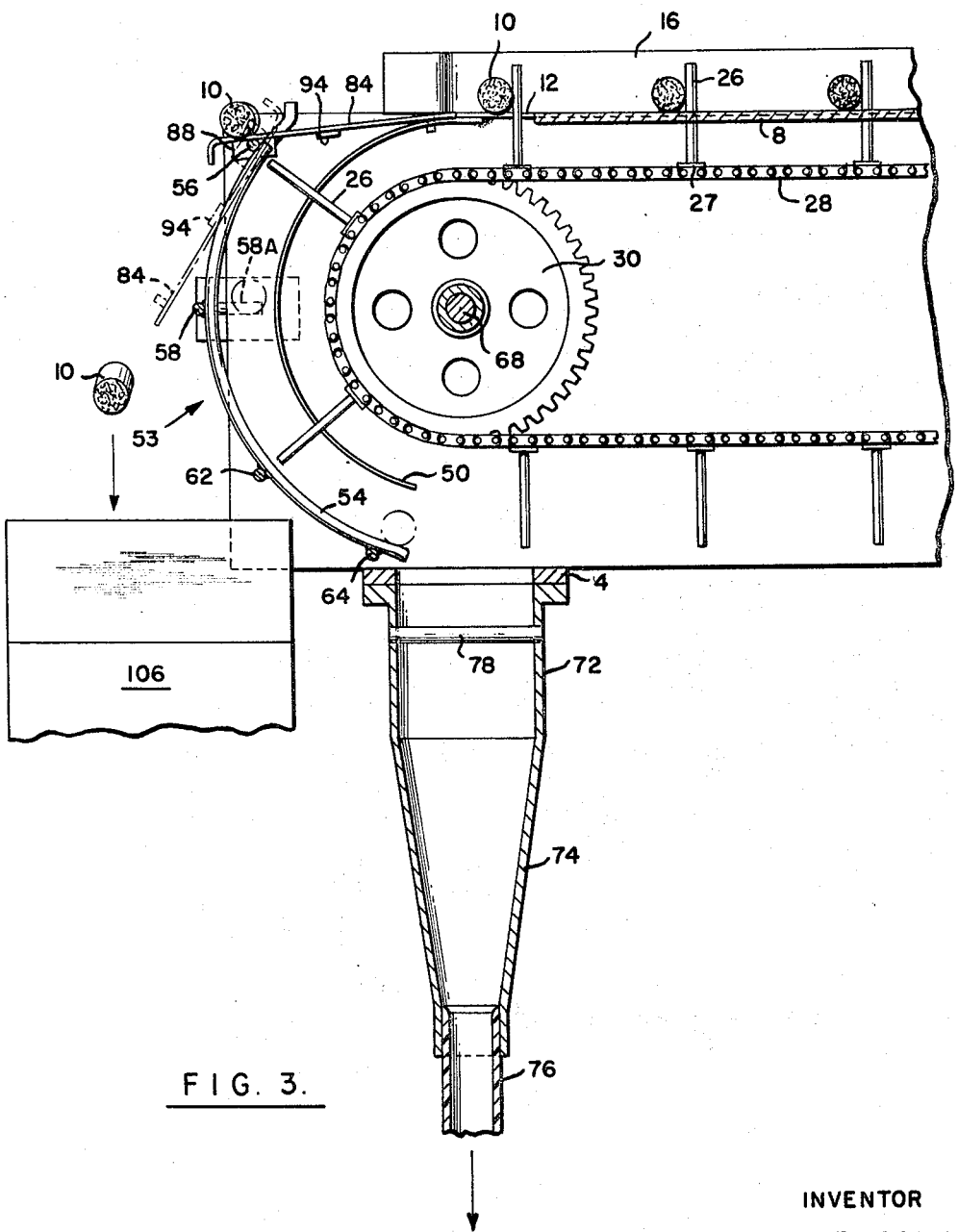
FIGURE 3 is a vertical section taken on the plane indicated by the line 3—3 in FIGURE 1.

In operation, the cigars 10 are conveyed along table 8 and strips 12 and 14 by means of fingers 26 and 40, as these fingers are advanced by chains 28 and 42 respectively with the cigars being conveyed below heater 6. In the event of an emergency with respect to conveyor 76, gate members 84 and 96 are positioned as shown in FIGURES 1 through 3 and the cigars 10 conveyed off table 8 are briefly supported on strips 12 and 14 alone and are then transferred onto gate members 84 and 96 which prevent the cigars from passing downwardly between guide rails 50 and 52 and outer guide member 53. Gate members 84 and 96 in the shunting position slope downwardly so that the cigars pass over the left hand end as viewed in FIGURES 1 and 3 and downwardly into a container shown at 106.

For normal operation, gate members 84 and 96 are pivoted so as to rest stop members 94 and 102 on the outermost rods 54 respectively, gate member 84 being shown in this position in phantom in FIGURE 3. Thus, in normal operation, the cigars 10 are advanced from strips 12 and 14 onto guide rails 50 and 52 and then fall downwardly between guide rails 50 and 52 and outer guide member 53 and into conduit 72 where they are engaged by flip pin 78 and thus flipped into a substantially upright position. The cigars then pass into pnuematic conduit 76.

Alternative embodiment

Figure 4:
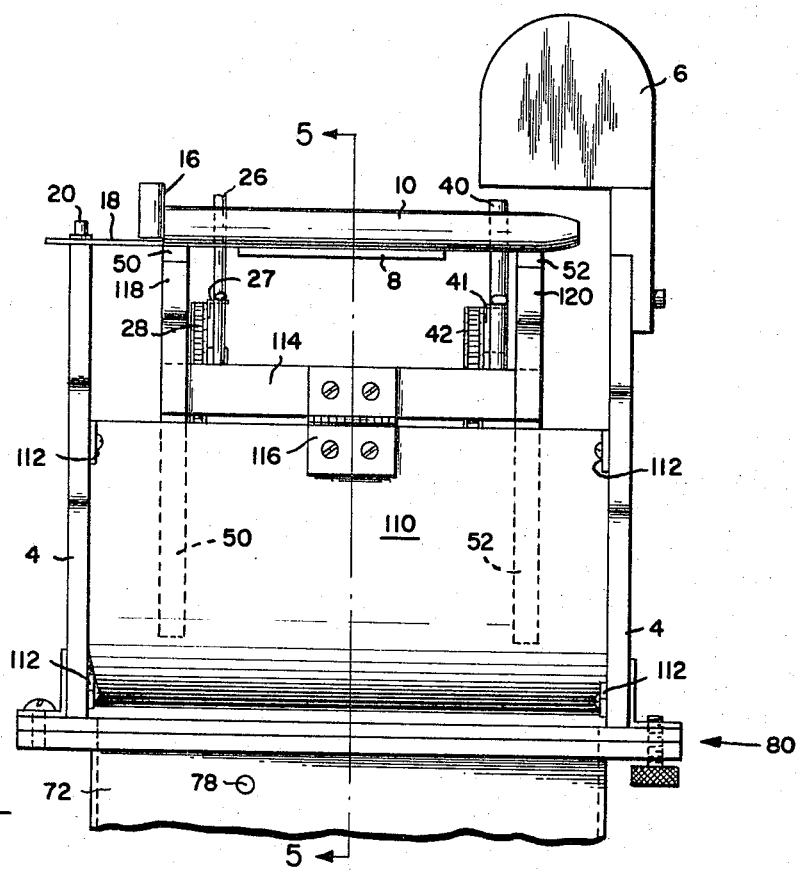
FIGURE 4 is an end view of the apparatus of FIGURE 1 modified to incorporate an alternative embodiment of the invention.
Figure 5:
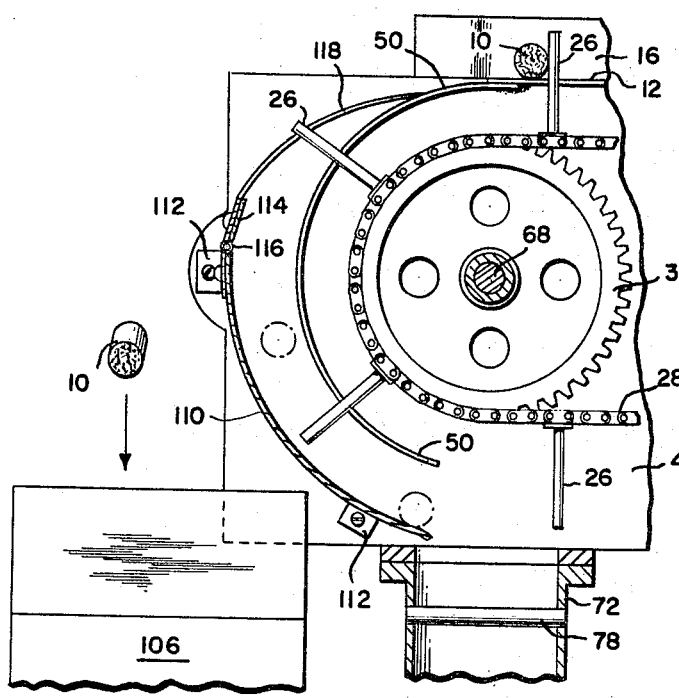
FIGURE 5 is a vertical section taken on the plane indicated by the line 5—5 in FIGURE 4.

Referring now to FIGURES 4 and 5, the apparatus of FIGURES 1 through 3 may be modified to provide an alternative outer guide member and gate arrangement. As shown in FIGURES 4 and 5, a solid arcuate outer guide member 110 is secured to frame 4 by means of brackets 112. Guide member 110 is spaced from guide rails 50 and 52 in a manner similar to guide member 53. A bar 114 is hingedly supported on guide member 110 by a hinge 116. A pair of gate members 118 and 120 are secured to bar 114 and rest in the operative position as shown in FIGURES 4 and 5 on guide rails 50 and 52 respectively in which position they prevent the cigars 10 from passing downwardly between guide rails 50 and 52 and guide member 110 to enter conduit 72 and rather cause the cigars to move downwardly over gate members 118 and 120 to be discharged into container 106. In order to provide for normal operation, bar 114 is pivoted on hinge 116 counterclockwise as viewed in FIGURE 5 to a position where gate members 118 and 120 will no longer prevent cigars 10 from passing between guide rails 50 and 52 and guide member 110.

It will be understood that the above described embodiments are intended to be illustrative rather than limiting.

What is claimed is:

In combination with a conveyor for elongated articles having fixed article supporting means, conveyor chain means having conveyor fingers to engage each article and passing around sprocket means at the discharge end of the conveyor, and guide means having an entrance adjacent the discharge end of the supporting means to guide articles in gravity fall to a conveyor discharging at a remote station, movable gate means to close the entrance to the guide means and guide the articles to discharge downwardly exterior of the guide means, said guide means comprising a pair of spaced guide rails adjacent the sprocket means and connected to the article supporting means, a guide member spaced outboard of the guide rails and beyond the reach of the conveyor fingers, and said gate means comprising a pair of spaced fingers pivotally mounted on said guide member.

References Cited
UNITED STATES PATENTS

| | | | |
|---|---|---|---|
| 1,899,179 | 2/1933 | Beutel et al. | 198—173 X |
| 1,908,771 | 5/1933 | Lied | 198—211 |
| 2,540,181 | 2/1951 | Zimpel | 198—23 |

EVON C. BLUNK, *Primary Examiner.*

R. J. HICKEY, *Assistant Examiner.*